US012117043B2

(12) United States Patent
Tseng et al.

(10) Patent No.: US 12,117,043 B2
(45) Date of Patent: Oct. 15, 2024

(54) AIR-FLOATING GUIDE RAIL

(71) Applicant: TOYO NANO SYSTEM CORPORATION, Hsinchu County (TW)

(72) Inventors: Kun-Cheng Tseng, Tainan (TW); Kuei-Tun Teng, Tainan (TW); Wei-Chih Chen, Hsinchu County (TW); Wen-Chung Lin, Hsinchu County (TW)

(73) Assignee: Toyo Nano System Corporation, Hsinchu County (TW)

( * ) Notice: Subject to any disclaimer, the term of this patent is extended or adjusted under 35 U.S.C. 154(b) by 149 days.

(21) Appl. No.: 18/085,097

(22) Filed: Dec. 20, 2022

(65) Prior Publication Data

US 2024/0133427 A1 Apr. 25, 2024
US 2024/0229863 A9 Jul. 11, 2024

(30) Foreign Application Priority Data

Oct. 19, 2022 (TW) .................................. 111139672

(51) Int. Cl.
*F16C 29/02* (2006.01)
*F16C 32/06* (2006.01)

(52) U.S. Cl.
CPC ........ *F16C 29/025* (2013.01); *F16C 32/0614* (2013.01); *F16C 2322/39* (2013.01)

(58) Field of Classification Search
CPC .. F16C 29/005; F16C 29/025; F16C 32/0614; F16C 32/0622; F16C 32/0625; F16C 32/0666; F16C 2202/04; F16C 2322/39
See application file for complete search history.

(56) References Cited

U.S. PATENT DOCUMENTS

| | | | | |
|---|---|---|---|---|
| 4,744,675 A | * | 5/1988 | Sakino | B23Q 1/58 384/12 |
| 4,773,769 A | * | 9/1988 | Church | F16C 29/12 384/42 |
| 6,247,845 B1 | * | 6/2001 | Pedrazzini | F16C 29/025 384/12 |

FOREIGN PATENT DOCUMENTS

| | | | | |
|---|---|---|---|---|
| JP | H08114230 A | * | 5/1996 | ............ F16C 29/025 |
| WO | WO-2009051192 A1 | * | 4/2009 | ............... B23Q 1/38 |

* cited by examiner

*Primary Examiner* — Phillip A Johnson
(74) *Attorney, Agent, or Firm* — Rosenberg, Klein & Lee

(57) ABSTRACT

An air-floating guide rail device includes a guide rail unit, a slider unit, and a linear motor unit. The guide rail unit includes a guide rail body and two air-floating block sets made of a material different from that of the guide rail body and each including top and side air-floating blocks. The slider unit includes a main sliding seat and two lateral sliding seats connected integrally to the main sliding seat and each having first and second guiding surfaces transverse to each other and disposed respectively adjacent to corresponding top and side air-floating blocks, and first and second air guiding passages connecting the first and second guiding surfaces to the external environment. The linear motor unit includes a stator and a mover mounted fixedly to the main sliding seat and movable relative to the stator for driving linear movement of the slider unit relative to the guide rail unit.

8 Claims, 2 Drawing Sheets

AIR-FLOATING GUIDE RAIL

CROSS-REFERENCE TO RELATED APPLICATION

This application claims priority to Taiwanese Invention Patent Application No. 111139672, filed on Oct. 19, 2022.

FIELD

The disclosure relates to a guide rail device, and more particularly to an air-floating guide rail device.

BACKGROUND

A conventional air-floating guide rail disclosed in Chinese Patent No. 209830882U includes a guide rail body, a linear motor, and a slide carriage. The guide rail body has a dovetail cross section. The slide carriage includes an upper slide carriage body and two side slide carriage bodies connected respectively to two opposite sides of the upper slide carriage body. Two upper throttles are disposed in the upper slide carriage body and a side throttle is disposed in each of the side slide carriage bodies. The upper slide carriage body cooperates with the side slide carriage bodies to define a receiving space that is dovetail-shaped thereamong. The guide rail body is disposed in the receiving space. The linear motor includes a stator and a mover. The stator is mounted fixedly in the guide rail body by a stator connector. The mover is connected to the upper slide carriage body by a mover connecter.

The guide rail body of the conventional air-floating guide rail is made of aluminum and a surface treatment to the guide rail body is usually required. Generally, the guide rail body is manufactured by a series of sequentially performed procedures including an aluminum extrusion process, a computer numerical control (CNC) process, a grinding process, a hard anodizing treatment, a cryogenic treatment, and a high precision grinding. However, a size of a processing sink for performing each of the hard anodizing treatment and the cryogenic treatment is usually relatively small, so in case that the guide rail body is relatively large in size, it is difficult to perform the hard anodizing treatment and the cryogenic treatment. Additionally, it is both cost and time consuming to perform the hard anodizing treatment and the cryogenic treatment.

SUMMARY

Therefore, an object of the disclosure is to provide an air-floating guide rail that can alleviate at least one of the drawbacks of the prior art.

According to the disclosure, an air-floating guide rail device includes a guide rail unit, a slider unit, and a linear motor unit. The guide rail unit includes a guide rail body and two air-floating block sets. The guide rail body is made of a first material and has two rail seats and a recess disposed between the rail seats. Each of the rail seats has an upper positioning surface and a side positioning surface that is transverse to the upper positioning surface. The air-floating block sets are mounted fixedly and respectively on the rail seats of the guide rail body, and are made of a second material which has a hardness greater than that of the first material and which has a ductility lower than that of the first material. Each of the air-floating block sets includes a top air-floating block and a side air-floating block. The top air-floating block is fixed onto the upper positioning surface of the respective one of the rail seats. The side air-floating block is fixed onto the side positioning surface of the respective one of the rail seats. The slider unit is slidable relative to the guide rail unit, and has a main sliding seat, two lateral sliding seat, a first air guiding passage, and a second air guiding passage. The lateral sliding seats are connected integrally and respectively to two lateral sides of the main sliding seat and flank the rail seats. Each of the lateral sliding seats has a first guiding surface and a second guiding surface. The first guiding surface of each of the lateral sliding seats is disposed adjacent to the top air-floating blocks of a respective one of the air-floating block sets. The second guiding surface of each of the lateral sliding seats is transverse to the first guiding surface, and is adjacent to the side air-floating block of the respective one of the air-floating block sets. The first air guiding passage is adapted for connecting the first guiding surface to an external environment. The second air guiding passage is adapted for connecting the second guiding surface to the external environment. The linear motor unit includes a stator and a mover. The stator is mounted in the recess of the guide rail unit and extends along the guide rail unit. The mover is mounted fixedly to the main sliding seat of the slider unit and is movable relative to the stator for driving linear movement of the slider unit relative to the guide rail unit.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
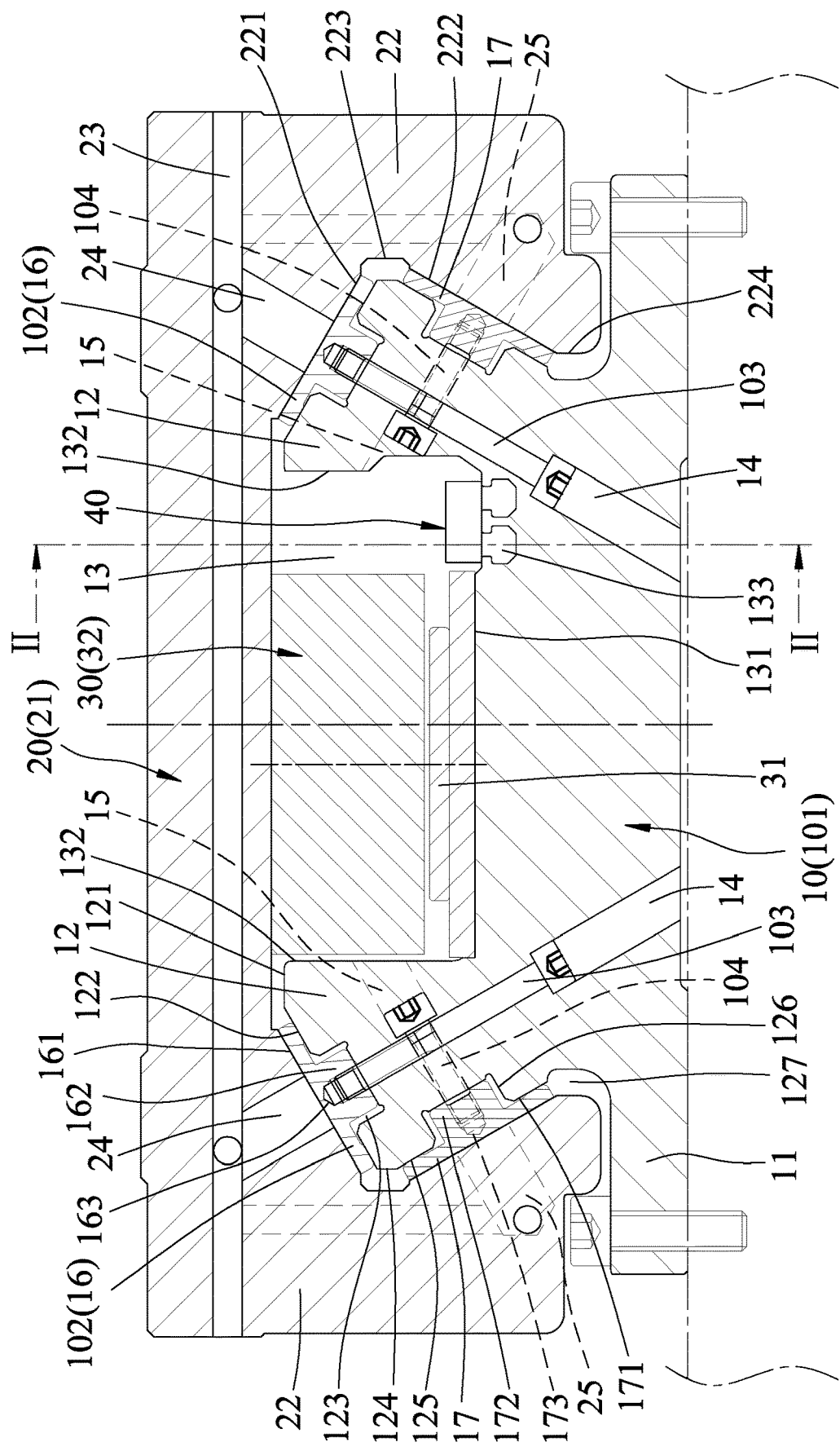
FIG. 1 is an assembled partly sectional view of an air-floating guide rail device of an embodiment according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently e.g., rotated 90 degrees or at other orientations and the spatially relative terms used herein may be interpreted accordingly.

Figure 2:
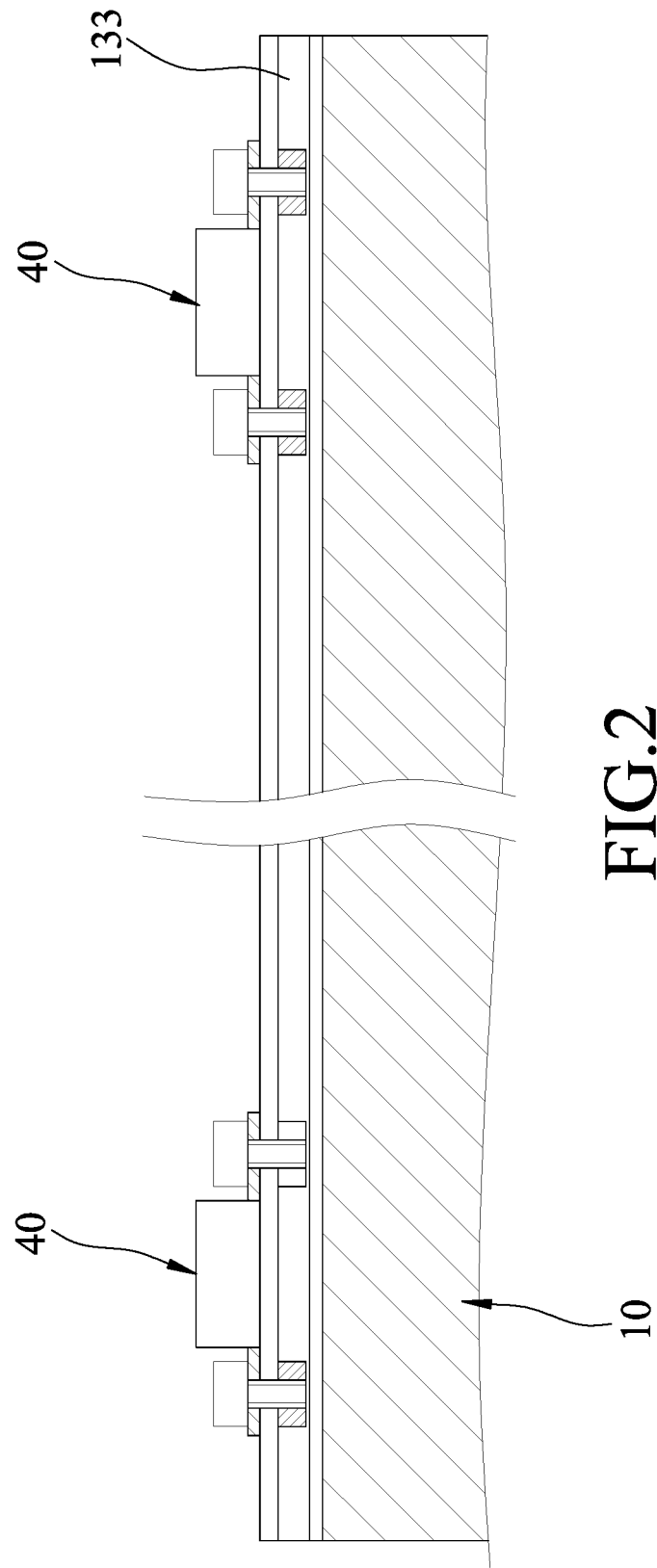
FIG. 2 is a sectional view of the embodiment taken along line II-II in FIG. 1.

Referring to FIGS. 1 and 2, an air-floating guide rail device of an embodiment according to the present disclosure includes a guide rail unit 10, a slider unit 20, a linear motor unit 30, and two sensors 40 (only one is visible in FIG. 1).

The guide rail unit 10 includes a guide rail body 101 made of a first material, two air-floating block sets 102 mounted fixedly and respectively on the rail seats 12 of the guide rail body 101, and made of a second material, two first bolts 103, and two second bolts 104. The second material has a hardness greater than that of the first material and has a ductility lower than that of the first material. In this embodiment, the first material is aluminum, and the second material is iron. The guide rail body 101 has a rail base 11, two rail seats 12 spaced apart from each other and connected integrally to the rail base 11, a recess 13 disposed between the rail seats 12, two first fastener holes 14, and two second fastener holes 15. Specifically, the rail base 11 is connected integrally to a lower portion of the rail seats 12.

Each of the rail seats 12 has a top surface 121 that is disposed adjacent to the recess 13, an upper positioning surface 122 that is connected to and inclined relative to the top surface 121, an upper receiving groove 123 that is formed in the upper positioning surface 122, a side positioning surface 125 that is transverse to the upper positioning surface 122, a turning surface 124 that interconnects the upper positioning surface 122 and the side positioning surface 125, a lower receiving groove 126 that is formed in the side positioning surface 125, and a first groove 127 that is formed adjacent to the side positioning surface 125 and away from the upper positioning surface 122. For each of the rail seats 12, the first groove 127 is indented to prevent from being processed by a processing tool, e.g., a grinding wheel, that grinds the side positioning surface 125.

The guide rail body 101 further has a groove bottom surface 131, two groove side surfaces 132, and a positioning groove 133. The groove side surfaces 132 are connected respectively to opposite ends of the groove bottom surface 131 and cooperate with the groove bottom surface 131 to define the recess 13 thereamong. The positioning groove 133 is formed in the groove bottom surface 131 and extends along the guide rail unit 10. It should be noted that the number of the positioning groove 133 is not limited to one and may be two or more in other embodiments of the present disclosure.

Each of the first fastener holes 14 extends through the rail base 11 and a respective one of the rail seats 12 to the upper receiving groove 123 of the respective one of the rail seats 12, and has a large hole portion and a small hole portion having a size smaller than that of the large hole portion.

Each of the second fastener holes 15 extends from the recess 13 through a respective one of the rail seats 12 to the lower receiving groove 126 of the respective one of the rail seats 12, and has a large hole portion and a small hole portion having a size smaller than that of the large hole portion of the second fastener hole 15.

Each of the air-floating block sets 102 includes a top air-floating block 16 that is fixed onto the upper positioning surface 122 of the respective one of the rail seats 12, and a side air-floating block 17 that is fixed onto the side positioning surface 125 of the respective one of the rail seats 12. The top air-floating block 16 of each of the air-floating block sets 102 has a T-shaped cross section, includes an outer section 161 abutting against the upper positioning surface 122 of the respective one of the rail seats 12, and an insertion section 162 connected integrally to the outer section 161 and received in the upper receiving groove 123 of the respective one of the rail seats 12, and is formed with a first threaded hole 163 extending from the outer section 161 to the insertion section 162. The side air-floating block 17 of each of the air-floating block sets 102 has a T-shaped cross section includes a first section 171 abutting against the side positioning surface 125 of the respective one of the rail seats 12, and a second section 172 connected integrally to the first section 171 and received in the lower receiving groove 126 of the respective one of the rail seats 12, and is formed with a second threaded hole 173 extending from the first section 171 to the second section 172.

Each of the first bolts 103 extends through a respective one of the first fastener holes 14 and engages the first threaded hole 163 of the top air-floating block 16 of a corresponding one of the air-floating block sets 102.

Each of the second bolts 104 extends through a respective one of the second fastener holes 15 and engages the second threaded hole 173 of the side air-floating block 17 of a corresponding one of the air-floating block sets 102.

The slider unit 20 is slidable relative to the guide rail unit 10. The slider unit 20 includes a main sliding seat 21, two lateral sliding seats 22 formed integrally with the main sliding seat 21, and a main air passage 23. The lateral sliding seats 22 are connected integrally and respectively to two lateral sides of the main sliding seat 21, and flank the rail seats 12. The main air passage 23 extends in the main sliding seat 21 and the lateral sliding seats 22. Each of the lateral sliding seats 22 has a first guiding surface 221 that is disposed adjacent to the top air-floating blocks 16 of a respective one of the air-floating block sets 102, a second guiding surface 222 that is transverse to the first guiding surface 221 and that is adjacent to the side air-floating block 17 of the respective one of the air-floating block sets 102, a first air guiding passage 24 that is adapted for connecting the first guiding surface 221 to an external environment, a second air guiding passage 25 that is adapted for connecting the second guiding surface 22 to the external environment, a second groove 223 that is formed between the first guiding surface 221 and the second guiding surface 222, and that is disposed adjacent to the turning surface 124 of the respective one of the rail seats 12, and an extending surface 224 that extends from the second guiding surface 222 away from the first guiding surface 221 and that is adjacent to the first groove 127 of the respective one of the rail seats 12. The main air passage 23 is in spatial communication with the first air guiding passages 24 and the second air guiding passages 25 of the lateral sliding seats 22 such that, for each of the lateral sliding seats 22, the first air guiding passage 24 and the second air guiding passage 25 are adapted for respectively connecting the first guiding surface 221 and the second guiding surface 222 to the external environment through the main air passage 23. For each of the lateral sliding seats 22, the second groove 223 is indented to prevent from being processed by a processing tool, e.g., a grinding wheel, that grinds the second guiding surface 222.

The linear motor 30 includes a stator 31 mounted in the recess 13 of the guide rail unit 10 and extending along the guide rail unit 10, and a mover 32 mounted fixedly to the main sliding seat 21 of the slider unit 20 and movable relative to the stator 31 for driving linear movement of the slider unit 20 relative to the guide rail unit 10. In this embodiment, the stator 31 is mounted in the groove bottom surface 131.

As shown in FIG. 2, the sensors 40 are mounted respectively to two ends of the positioning groove 133 that are opposite along the guide rail unit 10, and are configured to detect a position of the slider unit 20 relative to the guide rail unit 10. In this embodiment, the sensors 40 are connected to the positioning groove 133 through a plurality of screws but the present disclosure is not limited to this example.

To facilitate understanding of the effects provided by the air-floating guide rail device of the embodiment according to the present disclosure, operation of the same is described in the following.

As shown in FIG. 1, after the air-floating guide rail device is assembled, the top air-floating blocks 16 and the side air-floating blocks 17 of the air-floating block sets 102 are fastened to the rail seats 12 of the guide rail body 101 through the first bolts 103 and the second bolts 104, and the slider unit 20 is disposed on the guide rail unit 10. A gap having a width of approximately 0.01 mm is formed between the first guiding surface 221 of each of the lateral sliding seats 22 and the top air-floating block 16 of the respective one of the air-floating block sets 102. A gap having a width of approximately 0.01 mm is formed between the second guiding surface 222 of each of the lateral sliding seats 22 and the side air-floating block 17 of the respective one of the air-floating block sets 102. By virtue of the gaps formed between each of the first guiding surfaces 221 and the respective one of the top air-floating blocks 16 and between each of the second guiding surfaces 222 and the respective one of the side air-floating blocks 17, gas films are allowed to be formed respectively in the gaps so that for each of the lateral sliding seats 22, the first guiding surface 221 does not contact the top air-floating block 16 of the respective one of the air-floating block sets 102, and the second guiding surface 222 does not contact the side air-floating block 17 of the respective one of the air-floating block sets 102.

When the linear motor unit 30 is energized, pressurized air is introduced into the main air passage 23 and is guided into the first air guiding passages 24 to flow to the gap between each of the first guiding surfaces 221 and the respective one of the air-floating blocks 16 to form a gas film, and then pressurized air is guided into the second air guiding passages 25 to flow to the gap between each of the second guiding surfaces 222 and the respective one of the air-floating blocks 17 to form another gas film. In this way, the gas films serve as air bearings so the slider unit 20 may slide smoothly and linearly relative to the guide rail unit 10.

Additionally, by virtue of the motor 30 and the sensors 40, a position of the slider unit 20 relative to the guide rail unit 10 may be detected and a stroke of the slider unit 20 may be controlled.

Furthermore, the materials for making the guide rail body 101 and the air-floating block sets 102 of the guide rail unit 10 are different. The ductility of the first material is greater than that of the second material, and the hardness of the second material is greater than that of the first material, so during manufacturing of the guide rail body 101, a semi-finished product of the guide rail body 101 that undergoes an aluminum extrusion is processed by cutting or grinding so as to form the upper positioning surface 122 and the side positioning surface 125 of each of the rail seats 12, and then is drilled to form the first fastener holes 14 and the second fastener holes 15. Next, the top air-floating block 16 and the side air-floating block 17 of each of the air-floating block sets 102 are mounted respectively on the rail seats 12 of the guide rail body 101 and are treated with a high precision grinding process to complete the guide rail unit 10. As a result, it is not necessary to perform a hard anodizing treatment, a cryogenic treatment, etc. to the guide rail body 101. Thus, steps of manufacturing the embodiment may be simplified, and the manufacturing cost may be reduced.

In summary, the air-floating guide rail device of the present disclosure has a simple structure, is relative easy to manufacture, and has a relative low manufacturing cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An air-floating guide rail device comprising:
a guide rail unit that includes
a guide rail body made of a first material and having two rail seats and a recess disposed between said rail seats, each of said rail seats having an upper positioning surface and a side positioning surface that is transverse to said upper positioning surface, and
two air-floating block sets mounted fixedly and respectively on said rail seats of said guide rail body, and made of a second material which has a hardness greater than that of the first material and which has a ductility lower than that of the first material, each of said air-floating block sets including
a top air-floating block that is fixed onto said upper positioning surface of the respective one of said rail seats, and
a side air-floating block that is fixed onto said side positioning surface of the respective one of said rail seats;
a slider unit that is slidable relative to, and that includes
a main sliding seat,
two lateral sliding seats connected integrally and respectively to two lateral sides of said main sliding seat, and flanking said rail seats, each of said lateral sliding seats having
a first guiding surface that is disposed adjacent to said top air-floating blocks of a respective one of said air-floating block sets,
a second guiding surface that is transverse to said first guiding surface, and that is adjacent to said side air-floating block of the respective one of said air-floating block sets,
a first air guiding passage that is adapted for connecting said first guiding surface to an external environment, and
a second air guiding passage that is adapted for connecting said second guiding surface to the external environment; and
a linear motor unit that includes
a stator mounted in said recess of said guide rail unit and extending along said guide rail unit, and a mover mounted fixedly to said main sliding seat of said slider unit and movable relative to said stator for driving linear movement of said slider unit relative to said guide rail unit.

2. The air-floating guide rail device as claimed in claim 1, wherein said guide rail body is made of the first material that is aluminum, and said air-floating block sets is made of the second material that is iron.

3. The air-floating guide rail device as claimed in claim 2, wherein:
   each of said rail seats of said guide rail body further has an upper receiving groove formed in said upper positioning surface, and a lower receiving groove formed in said side positioning surface;
   said top air-floating block of each of said air-floating block sets has a T-shaped cross section, and includes
      an outer section abutting against said upper positioning surface of the respective one of said rail seats, and
      an insertion section connected integrally to said outer section and received in said upper receiving groove of the respective one of said rail seats; and
   said side air-floating block of each of said air-floating block sets has a T-shaped cross section, and includes
      a first section abutting against said side positioning surface of the respective one of said rail seats, and
      a second section connected integrally to said first section and received in said lower receiving groove of the respective one of said rail seats.

4. The air-floating guide rail device as claimed in claim 3, wherein:
   said guide rail body of said guide rail unit further has
      a rail base connected integrally to a lower portion of said rail seats,
      two first fastener holes, each extending through said rail base and a respective one of said rail seats to said upper receiving groove of the respective one of said rail seats, and
      two second fastener holes, each extending from said recess through a respective one of said rail seats to said lower receiving groove of the respective one of said rail seats;
   said top air-floating block of each of said air-floating block sets is formed with a first threaded hole extending from said outer section to said insertion section;
   said side air-floating block of each of said air-floating block sets is formed with a second threaded hole extending from said first section to said second section; and
   said guide rail unit further includes
      two first bolts, each extending through a respective one of said first fastener holes and engaging said first threaded hole of said top air-floating block of a corresponding one of said air-floating block sets, and
      two second bolts each extending through a respective one of said second fastener holes and engaging said second threaded hole of said side air-floating block of a corresponding one of said air-floating block sets.

5. The air-floating guide rail device as claimed in claim 1, wherein said each of said rail seats of said guide rail body further has:
   a turning surface interconnecting said upper positioning surface and said side positioning surface; and
   a first groove formed adjacent to said side positioning surface and away from said upper positioning surface.

6. The air-floating guide rail device as claimed in claim 5, wherein:
   each of said lateral sliding seats of said slider unit further has
      a second groove formed between said first guiding surface and said second guiding surface, and disposed adjacent to said turning surface of the respective one of said rail seats; and
      an extending surface extending from said second guiding surface away from said first guiding surface and adjacent to said first groove of the respective one of said rail seats.

7. The air-floating guide rail device as claimed in claim 1, wherein said slider unit further includes a main air passage that extends in said main sliding seat and said lateral sliding seats, and that is in spatial communication with said first air guiding passages and said second air guiding passages of said lateral sliding seats.

8. The air-floating guide rail device as claimed in claim 1, wherein:
   said guide rail body further has
      a groove bottom surface,
      two groove side surfaces connected respectively to opposite ends of said groove bottom surface and cooperating with said groove bottom surface to define said recess thereamong, and
      a positioning groove formed in said groove bottom surface and extending along said guide rail unit; and
   said air-floating guide rail device further comprises two sensors mounted in said positioning groove along said guide rail unit, and configured to detect a position of said slider unit.

* * * * *